United States Patent [19]

Kerkonian

[11] Patent Number: 5,246,721
[45] Date of Patent: Sep. 21, 1993

[54] METHOD AND APPARATUS FOR FORMING A FOOD ARTICLE

[76] Inventor: Siragan Kerkonian, 450 Greenwood, Glenview, Ill. 60025

[21] Appl. No.: 928,290

[22] Filed: Aug. 12, 1992

[51] Int. Cl.$^5$ .......................... A22C 7/00; A23P 1/00
[52] U.S. Cl. .................... 426/279; 99/450.6;
  99/450.7; 425/412; 425/444; 426/280; 426/282;
  426/513
[58] Field of Search .............. 426/279, 280, 282, 283,
  426/284, 138, 513, 514; 99/450.6, 450.7;
  425/412, 438, 444

[56] References Cited

U.S. PATENT DOCUMENTS

| | | | |
|---|---|---|---|
| 833,102 | 10/1906 | Winans | 426/282 |
| 1,383,290 | 7/1921 | Cressey | 426/283 |
| 1,802,698 | 4/1931 | Blanchard | 426/138 |
| 2,386,993 | 10/1945 | Valdastri, Sr. | 426/283 |
| 2,508,724 | 5/1950 | Moffett | 426/138 |
| 2,855,305 | 10/1958 | Cella | 426/274 |
| 2,960,045 | 11/1960 | Pentzlin | 426/284 |
| 3,232,246 | 2/1966 | Nishkian | 425/418 |
| 3,410,691 | 11/1968 | Stanley | 426/283 |
| 3,431,869 | 3/1969 | Frank | 426/514 |
| 3,551,161 | 12/1970 | Whitestone | 426/283 |
| 3,666,388 | 5/1972 | Oberwelland et al. | 426/279 |
| 3,770,458 | 11/1973 | Garnett | 426/512 |
| 3,961,089 | 6/1976 | Dogliotti | 426/274 |
| 4,004,035 | 1/1977 | Hirzel et al. | 426/275 |
| 4,112,127 | 9/1978 | Popeil | 426/283 |
| 4,309,450 | 1/1982 | Seibert | 426/275 |
| 4,382,970 | 5/1983 | Sorensen | 426/275 |
| 4,530,275 | 7/1985 | Stickle et al. | 99/353 |
| 4,543,053 | 9/1985 | Jasniewski | 425/289 |
| 4,574,088 | 3/1986 | Bowden | 426/275 |
| 4,579,745 | 4/1986 | Mei Sue | 426/512 |

Primary Examiner—George Yeung
Attorney, Agent, or Firm—Wood, Phillips, Van Santen, Hoffman & Ertel

[57] ABSTRACT

An apparatus and method is provided for forming a food article having a spheroidal shell with a filling. The apparatus includes a female mold body with a cavity which has walls that define the bottom and lateral shape of the spheroidal shell. A plurality of male mold plugs are sequentially inserted into the cavity of the female mold body. A measuring plug inserted in the cavity evenly distributes a charge of shell-forming material in the lower portion of the cavity. A shell-forming plug inserted in the cavity redistributes the evenly distributed charge of shell-forming material in a layer of generally uniform thickness at the bottom and along the lateral walls of the cavity, leaving an open-ended shell on removal of the shell-forming plug. A charge of filler is received in the open-ended shell. A shell-closing plug having a concave end surface is then inserted in the cavity to form the upper portion of the shell material over the top of the filler to complete the food article. The female mold member has a movable lift plug at the lower end of the cavity to remove the completed food article from the cavity.

11 Claims, 2 Drawing Sheets

METHOD AND APPARATUS FOR FORMING A FOOD ARTICLE

FIELD OF INVENTION

This invention relates to a method and an apparatus for forming a food article. More particularly, it relates to a method and an apparatus for forming a food shell containing a food filling.

BACKGROUND OF THE INVENTION

The use of cooperating male and female molds to produce shell-surrounded foods is known in the art. The shells are formed by inserting the male mold in the female mold so that shell-forming material conforms to the space between the two molds.

The shell for kibbe, a Middle Eastern food is currently formed by working the finely ground meat by hand. The meat is placed in the palm of one hand while the fingers from the other hand work the meat. This process is not only tiresome and slow, but it is difficult to control the thickness of the shell to achieve uniformity. Often-times, the shell will simply fall apart requiring the process to be repeated.

Other shell-surrounded foods prepared with cooperating male and female molds use a shell-forming material that can be either a liquid or plastic material when deposited in the female mold. When the material is liquid, the material naturally is uniformly distributed to form the shell when the male mold is inserted into the female mold. On the other hand, when a plastic, non-liquid material is used, uniform distribution of the plastic, shell-forming material is difficult to obtain.

After the shell has been formed, the male mold is removed from the female mold. Because of the tendency of the shell to stick to the surface of the male mold, the shell will be distorted when the male mold is removed from the female mold.

After removal of the male mold, a food filling is placed in the open-ended shell, whereupon the shell is closed so that it surrounds the food filling. Closing the shell can be accomplished by depositing additional shell-forming material in the open end of the formed shell as described in U.S. Pat. No. 833,102. This requires an additional step and additional shell material and can cause the shell material to intermix with the filling. This is particularly undesirable when the shell material and the filling are different types of food.

U.S. Pat. No. 4,579,745 uses pivotable arms to bring the ends of an open-ended shell together. The use of pivotable arms requires moving parts and further requires the female mold to be provided with suitable means for receiving the arms, thereby increasing the complexity of the device.

SUMMARY OF THE INVENTION

Accordingly, one object of the invention is to provide a new and improved method and apparatus for forming a food article.

Another object is to provide a novel and improved method and apparatus to evenly distribute a plastic, shell-forming material in the female mold.

Still another object of this invention is to provide a novel and improved method and apparatus for removing the male mold from the female mold without distorting the shape of the formed shell.

Yet another object of this invention is to provide a novel and improved method and apparatus for closing the formed shell without causing any intermixture of the shell and food filling.

Briefly, in accordance with one aspect of this invention, an apparatus is provided for forming a food article having a spheroidal shell with a filling. The apparatus includes a female mold member body with a cavity which has walls that define the bottom and lateral shape of the spheroidal shell. A plurality of male mold plugs are sequentially inserted into the cavity of the female mold member body. A measuring plug inserted in the cavity evenly distributes a charge of shell-forming material in the lower portion of the cavity. A shell-forming plug inserted in the cavity redistributes the evenly distributed charge of shell-forming material in a layer of generally uniform thickness at the bottom and along the lateral walls of the cavity, leaving an open-ended shell on removal of the shell-forming plug. A charge of filler is received in the open-ended shell. A shell-closing plug having a concave end surface is then inserted in the cavity to form the upper portion of the shell material over the top of the filler to complete the food article. The female mold member has a movable lift plug at the lower end of the cavity to remove the completed food article from the cavity.

DESCRIPTION OF THE DRAWINGS

FIG. 3 is a vertical section of a female mold member body with a charge of shell-forming material in the mold cavity;

FIG. 4 is a vertical section of the female mold member and a carrier plate with a male measuring plug distributing the shell-forming material in the cavity;

FIG. 5 is a vertical section of the female mold member and a carrier plate with a shell-forming plug taken along line 5—5 of FIG. 5A;

FIG. 6 is similar to FIG. 5 with the central pin of the shell-forming plug removed;

FIG. 7 is similar to FIG. 6 with the shell-forming plug removed from the cavity;

FIG. 8 is similar to FIG. 7 with a filling added to the open-ended shell;

FIG. 9 is a vertical section of a shell-closing plug in the cavity to complete the food article; and FIG. 10 is a sectional view, taken along line 10—10 in FIG. 9, showing the lift plug raised to remove the food article from the cavity.

DETAILED DESCRIPTION OF THE DRAWINGS

Figure 1:
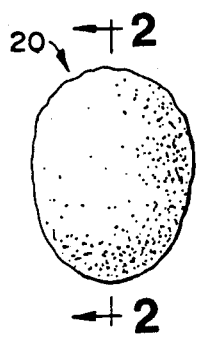
FIG. 1 is a side elevation view of a food article formed by the method and apparatus of the invention.
Figure 2:
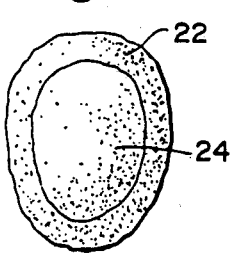
FIG. 2 is a cross-sectional view taken along line 2—2 of FIG. 1.

As seen in FIGS. 1 and 2, a food article 20 has a generally elliptical shape. The food article 20 includes a spheroidal shell 22 that surrounds a filling 24.

An example of such a food article 20 is kibbe, a traditional Middle Eastern food. Kibbe can be made from various materials for the shell and filling. Kibbe can have a shell material made from a seasoned, finely ground meat, such as lamb, chicken or turkey, mixed with a binder, such as egg or bulgur wheat. The shell can also be a potato and flour mixture. The shell is typically stuffed with seasoned, coarsely ground meat with the binder being bulgur wheat and pine nuts. Alternatively, the binder can include vegetables and rice, or the shell can simply be stuffed with these without the ground meat. Kibbe can be rapidly and uniformly produced with the method and apparatus illustrated in FIGS. 3–10.

Figure 3:
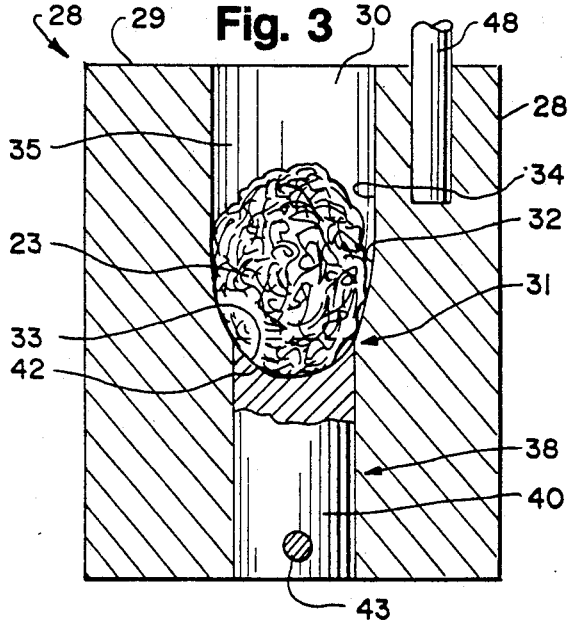

FIG. 3 shows a female mold member body 28 having an upwardly-opening cavity 30 therein. The cavity 30 has bottom and lateral walls, 32 and 34, respectively. The lateral walls 34 define a cylindrical space 35 in the cavity 30 while the bottom walls 32 define a concave space 33 at the lower end of the cavity 30. Means for removing the food article 38 include a lift plug 40 with a concave upper surface 42 at the lower end 31 of the cavity 30. The lift plug 40 slidably fits in the lower end 31 of the cavity 30. A charge of shell-forming material 23 is received in the cavity 30.

Figure 4:
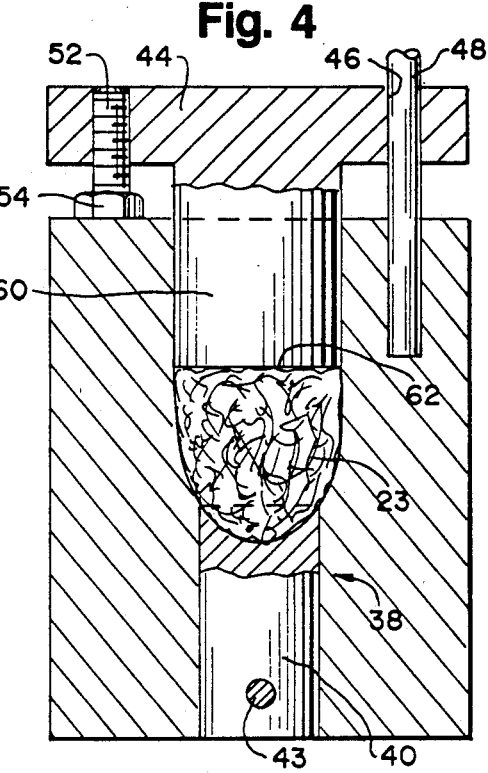
FIGS. 3 to 10 show the method and apparatus for forming a food article having a spheroidal shell with a filling.
Figure 5:
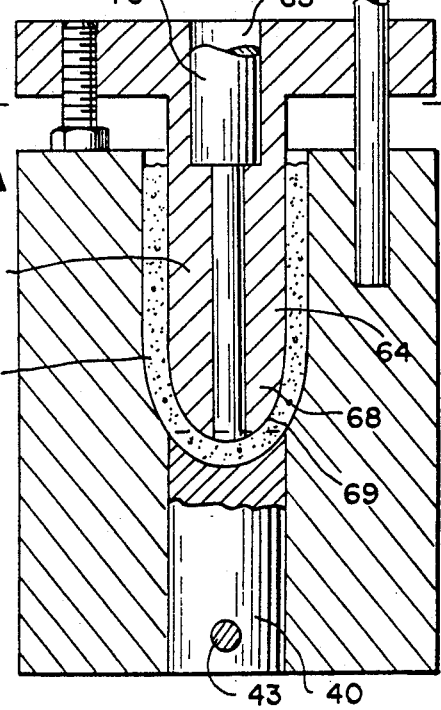
Figure 10:
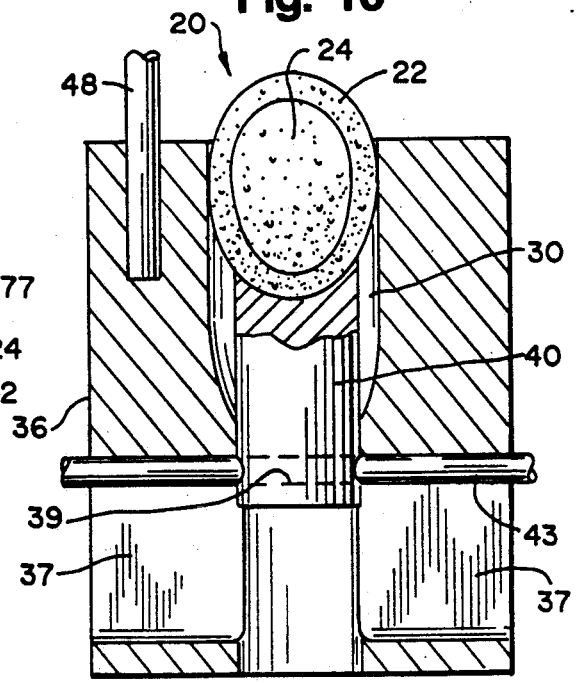

Each of the various male mold plugs illustrated in FIGS. 4, 5 and 10 is integrally formed with its own carrier plate 44. The carrier plates 44 have holes 46 therethrough which receive guide rods 48 extending from an upper surface 29 of the female body 28 to locate the male plugs in the cavity 30. The carrier plates 44 include movement limiting means 50 as screw 52 to establish the depth plugs descend in the cavity 30. The screw 52 is threaded into the carrier plate 44. A bolt head 54 on the screw 52 engages the upper surface 29 of the female body 28 when the carrier plate 44 is moved towards the female mold upper surface 29 while lowering the associated male plug into the cavity 30. This configuration allows the screws 52 to be adjusted to vary the position of the male plug in the cavity 30.

FIG. 4 shows a measuring plug 60 associated with a carrier plate 44. The measuring plug 60 has a cylindrical shape with a diameter that allows it to slidably fit in the cavity 30. A flat lower end surface 62 of the measuring plug 60 evenly distributes the shell forming material 23 in the cavity 30. The measuring plug 60 can be lowered to different depths in the cavity 30 by way of the carrier plate 44 thereby allowing the food-forming apparatus to accommodate different quantities of shell-forming material 23 while still obtaining an even distribution of the shell-forming material 23 in the lower portion 31 of the cavity 30.

Figure 5A:
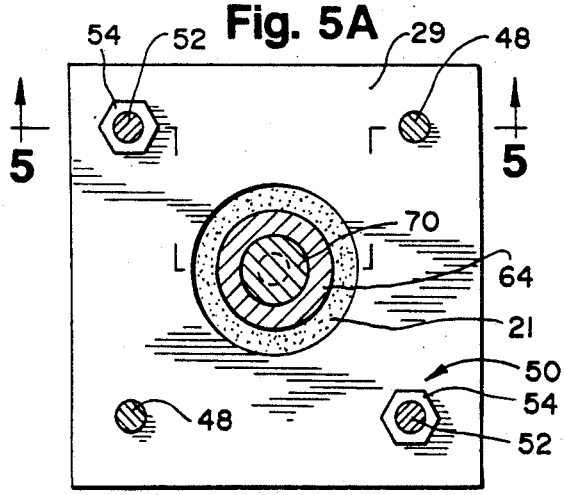
FIG. 5A is a transverse section along line 5A—5A of FIG. 5.

Referring now to FIGS. 5 and 5A, a shell-forming plug 64 is lowered in the cavity 30 by way of the carrier plate 44, previously described. The forming plug 64 has a cylindrical section 66 extending from the carrier plate 44. The cylindrical section 66 complements the cylindrical space 35 of the cavity 30 defined by the lateral walls 34 of the female body 28. At its lower end 68, the forming plug 64 has a rounded convex surface 69 so that, when inserted in the cavity 30, the lower end 68 complements the concave space 33 of the cavity 30 defined by the bottom walls 32 of the female body 28.

Figure 6:
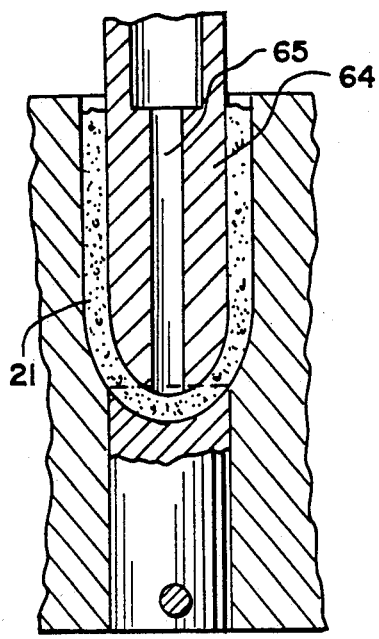

The shell-forming plug 64 has a central pin 70 removably received therein. The forming plug 64 has a longitudinally-extending bore 65 that receives the central pin 70. After the forming plug 64 with the central pin 70 is inserted into the cavity 30 to redistribute the evenly distributed charge of shell-forming material 23 in a layer of generally uniform thickness along the bottom and lateral walls, 32 and 34, respectively leaving an open-ended shell 21, the central pin 70 is retracted from the longitudinally-extending bore 65, as seen in FIG. 6, to admit air to the cavity 30. The air received in the cavity 30 allows the forming plug 64 to be removed from the cavity without distorting the formed open-ended shell 21, shown in FIG. 7. After forming the open-ended shell 21, a charge of filler 24 for the food article is added, illustrated in FIG. 8.

Figure 9:
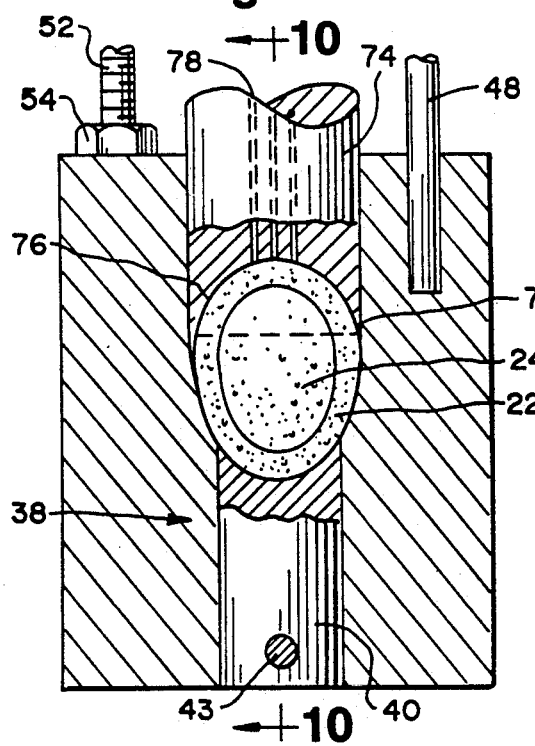

A shell-closing plug 74 in the cavity 30 is shown in FIG. 9. The closing plug 74 is supported on the carrier plate 44 previously described. The closing plug 74 is cylindrical in shape and extends from the carrier plate 44 to sharp edges 77 which define a concave end surface 76 of the closing plug 74. The cylindrical shape of the closing plug 74 complements the cylindrical space 35 of the cavity 30 so that, when the closing plug 74 is inserted in the cavity 30 containing the formed open-ended shell 21 with added filling 24, the concave end surface 76 of the closing plug 74 is opposed to the concave upper surface 42 of the lift plug 40. The sharp edges 77 of the closing plug 74 scrape the open-ended shell 21 off the lateral walls 34 of the cavity 30 to complete the food article 20 by closing the open-ended shell 21 around the filling 24. A plurality of air passageways 78 extend longitudinally through the closing plug 74 admitting air to the cavity 30 so that the closing plug 74 can be removed after completing the food article 20 without distorting the same.

A means 38 for removing the completed food article 20 from the female mold cavity 28, FIG. 10, includes the lift plug 40 with a laterally-extending hole 39 for receiving a rod 43 extending through slots 37 on the sides 36 of the female mold member body 28. Raising the rod 43 vertically raises the lift plug 40 in the cavity 30 allowing the completed food article 20 to be removed from the female mold 28.

A method for forming the food article 20 will now be described with reference to FIGS. 3 through 10.

The female mold member body 28 including the removing means 38 receives the charge of shell-forming material 23 in the cavity 30 (FIG. 3).

The measuring plug 60 is then lowered into the cavity 30 to evenly distribute the charge of shell-forming material in the lower portion 31 of the cavity 30 (FIG. 4). The depth to which the measuring plug 60 is lowered is regulated by adjusting the screws 52 of the carrier plate 44.

After the shell forming material 23 has been evenly distributed, the shell-forming plug 64 containing the central pin 70 is lowered into the cavity 30 (FIG. 5). The cylindrical section 66 of the forming plug 64 can have various diameters to permit the shell 22 to be made with varying thicknesses. Furthermore, because the measuring plug 60 has already evenly distributed the shell-forming material in the cavity 30, and since the guide rods 48 act to centrally locate the forming plug 64 in the cavity 30, the shell-forming material 23 is forced to redistribute along the bottom and lateral walls, 32 and 34, respectively, of the female mold body 28 in a layer of generally uniform thickness.

Figure 7:
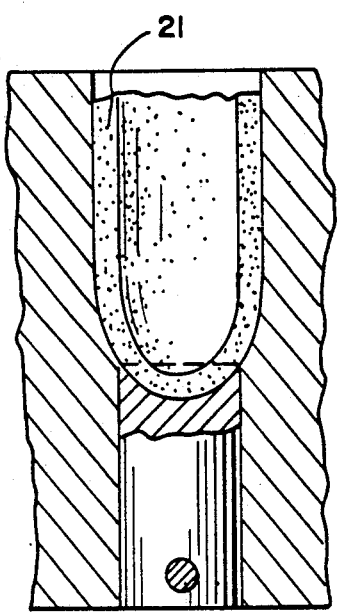
Figure 8:
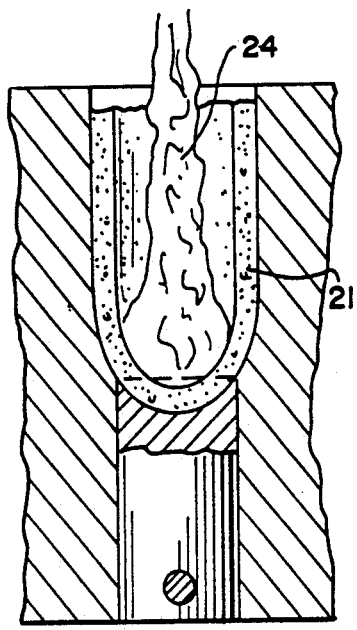

Before the forming plug is removed from the cavity 30, the central pin 70 is retracted from the longitudinally-extending bore 65 in the forming plug 64 (FIG. 6). This admits air to the cavity 30 permitting the forming plug 64 to be withdrawn from the cavity without distorting the shape of the open-ended shell 21 (FIG. 7).

Once the uniform open-ended shell 21 is formed, filling 24 is added (FIG. 8) and the open-ended shell 21 is closed so that it surrounds the filling 24. To complete the open-ended shell 21, the shell-closing plug 74 is inserted into the cavity 30 (FIG. 9). The depth to which the closing plug 74 is lowered is regulated by adjusting the screws 52 of the carrier plate 44. When lowered in the cavity 30, the concave end surface 76 of the closing plug 74 contacts the upper portion of the formed open-ended shell 21 along the lateral walls 34 of the female body 28 so that the contacted portion conforms to the shape of the concave end surface 76 and completes the shell 22. The air passageways 78 admit air to the cavity 30 allowing the closing plug to be withdrawn without distorting the shape of the completed food article 20.

After the food article 20 has been completely formed, the lift plug 40 is raised by the rod 43 to remove the food article 20 from the female mold body 28 in an easy and simple manner while retaining the integrity of the food article 20 (FIG. 10).

I claim:

1. An apparatus for forming a food article having a spheroidal shell with a filling, comprising:
   a female mold member body having an upwardly opening cavity therein with bottom and lateral walls, the walls defining the bottom and lateral configuration of said spheroidal shell;
   and a plurality of male mold plugs sequentially inserted in the cavity of the female mold member, including:
   (a) a measuring plug which on insertion into the female mold cavity evenly distributes a charge of shell forming material in the lower portion of the cavity,
   (b) a shell forming plug which on insertion in the cavity of the female mold member redistributes the evenly distributed charge of shell forming material in a layer of generally uniform thickness at the bottom and along the lateral walls of the cavity, leaving an open-ended shell on removal of the shell forming plug, the shell receiving a charge of filler for the food article, and
   (c) a shell closing plug having sharp edges defining a concave end surface which on insertion of the plug into the cavity of the female mold member forms the upper portion of the shell material over the top of the filler, completing the food article; and
   (d) means for removing the completed food article from the female mold member.

2. The apparatus of claim 1 in which the female cavity is cylindrical and the measuring plug is cylindrical with a flat lower end.

3. The food forming apparatus of claim 1 in which the lower end of the cavity is concave and the lower end of the shell forming plug is convex.

4. The food forming apparatus of claim 1 in which the means for removing the food article from the female mold cavity includes a lift plug at the lower end of the cavity, the lift plug being movable to lift the food article from the cavity.

5. The food forming apparatus of claim 1 wherein the female mold has an upper surface with guide rods extending upwardly from the upper surface; each of the male plugs has a carrier plate with holes receiving the guide rods to guide movement of the plug; and means for limiting the movement of the carrier plate and plug toward the female mold surface.

6. The food forming apparatus of claim 5 in which the movement limiting means is a screw threaded to the plate and engageable with the female mold surface.

7. The food forming apparatus of claim 1 wherein the shell-forming plug has a central pin removably received in a longitudinally-extending bore through the shell-forming plug such that removal of the central pin from the bore of the shell-forming plug inserted in the female mold cavity admits air into the bore so that the shell-forming plug can be retracted from the female mold cavity without distorting the shape of the layer of shell-forming material.

8. The food forming apparatus of claim 1 wherein the shell-closing plug has a plurality of air passageways longitudinally extending through the shell-closing plug admitting air into the passageways while allowing the shell-closing plug to be removed from the female mold cavity without distorting the shape of the completed food article.

9. A method for forming a food article having a spheroidal shell with a filling, comprising the steps of:
   (a) placing a charge of shell-forming material in an upwardly-opening cavity in a female mold member,
   (b) evenly distributing the charge in the lower portion of the cavity by inserting a measuring plug in the cavity,
   (c) forming an open-ended shell from the shell-forming material by inserting a shell-forming plug in the cavity,
   (d) adding the food filling to partially fill the open-ended shell,
   (e) closing the open-end of the shell around the food filling, and
   (f) removing the completed food article from the cavity.

10. The method of claim 9 wherein the shell-forming plug has a central pin removably located therein so that retracting the central pin from the shell-forming plug admits air to the cavity allowing the shell-forming plug to be removed from the cavity without distorting the shape of the open-ended shell.

11. The method of claim 9, wherein the open-ended shell is closed around the filling by inserting a shell-closing plug in the cavity, the shell-closing plug having a plurality of air passageways allowing for the removal of the shell-closing plug without distorting the shape of the completely formed food article.

* * * * *